United States Patent
White

(10) Patent No.: US 9,550,278 B2
(45) Date of Patent: Jan. 24, 2017

(54) TIRE BEADING LOCKING TOOL AND METHOD FOR MAKING SAME

(75) Inventor: Michael R. White, Montgomery City, MO (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 13/206,541

(22) Filed: Aug. 10, 2011

(65) Prior Publication Data

US 2013/0037222 A1 Feb. 14, 2013

(51) Int. Cl.

| | |
|---|---|
| B60C 25/00 | (2006.01) |
| B25B 7/02 | (2006.01) |
| B25B 7/12 | (2006.01) |
| B60C 25/02 | (2006.01) |

(52) U.S. Cl.
CPC ............. *B25B 7/02* (2013.01); *B25B 7/123* (2013.01); *B60C 25/02* (2013.01)

(58) Field of Classification Search
CPC ............. B25B 7/02; B25B 7/123; B60C 25/02
USPC ........ 157/1.17, 1.3, 1.45, 1.1, 1.22; 81/3.27, 81/3.4, 304, 339, 318, 351, 356, 427.5, 489, 81/485
See application file for complete search history.

(56) References Cited

U.S. PATENT DOCUMENTS

| | | | | |
|---|---|---|---|---|
| 1,400,453 | A | * | 12/1921 | Nation ........................ 254/50.1 |
| 1,452,596 | A | * | 4/1923 | De Fernelmont ............ 157/1.17 |
| 1,640,883 | A | | 8/1927 | Coleman |
| 1,885,579 | A | * | 11/1932 | Boynton ........................ 81/9.24 |
| 2,402,022 | A | * | 6/1946 | Corbell ........................ 157/1.17 |
| 3,842,696 | A | | 10/1974 | Wayne |
| 3,908,490 | A | | 9/1975 | Durham |
| 4,315,447 | A | | 2/1982 | Tartaglia et al. |
| 4,785,865 | A | * | 11/1988 | Folstad ........................ 157/1.17 |
| 5,191,934 | A | | 3/1993 | Wicklund |
| 5,265,661 | A | * | 11/1993 | Tran ............................ 157/1.3 |
| 5,460,461 | A | | 10/1995 | McGrath |
| 5,609,080 | A | | 3/1997 | Flavigny |
| 5,902,015 | A | | 5/1999 | Allcock |
| D426,440 | S | | 6/2000 | Torres |
| 6,182,736 | B1 | | 2/2001 | Cunningham et al. |

(Continued)

FOREIGN PATENT DOCUMENTS

EP 0522587 A2 10/1992

OTHER PUBLICATIONS

Ken-Tool, Catalog KT1110, pp. 2, 3, 27 and 37. Printed from internet May 19, 2011. www.kentool.com.
European Search Report dated Sep. 28, 2012.

*Primary Examiner* — Hadi Shakeri
*Assistant Examiner* — Danny Hong
(74) *Attorney, Agent, or Firm* — Baker Hostetler LLP

(57) ABSTRACT

A tire bead locking tool is provided. The tool may include a body; a first jaw connected to the body; a second jaw pivotally connected to the body and located to oppose the first jaw; a locking mechanism configured to selectively lock the first and second jaws in a relative position with respect to each other; and a resilient member attached to one of the first and second jaws and located between the first and second jaws. A method of manufacturing may also be provide. The method may include: forming a body; forming a pair of jaws on the body wherein at least one of the jaws pivots with respect to the body; attaching a resilient member to at least one of the jaws; and forming a locking mechanism that can selectively lock the jaws in a position; and extending a handle further from the jaws than the locking mechanism.

17 Claims, 4 Drawing Sheets

(56) References Cited

U.S. PATENT DOCUMENTS

| | | | |
|---|---|---|---|
| 6,269,861 B1 | 8/2001 | Tran | |
| 6,273,171 B1 | 8/2001 | Kliskey | |
| 6,279,433 B1 | 8/2001 | Chervenak | |
| 7,124,800 B2 * | 10/2006 | Tran | 157/1.17 |
| 7,306,023 B2 | 12/2007 | Gonzaga | |
| 7,513,288 B2 | 4/2009 | Corghi | |
| 7,600,305 B2 * | 10/2009 | Ploeger et al. | 29/235 |
| 7,640,963 B2 | 1/2010 | Lawson et al. | |
| 2008/0289772 A1 | 11/2008 | Reeves, Jr. et al. | |
| 2009/0056510 A1 | 3/2009 | Buchanan et al. | |
| 2009/0064826 A1 | 3/2009 | Robert | |
| 2009/0107639 A1 | 4/2009 | Foster | |
| 2010/0101735 A1 | 4/2010 | Lawson et al. | |

\* cited by examiner

TIRE BEADING LOCKING TOOL AND METHOD FOR MAKING SAME

FIELD OF THE INVENTION

The present invention relates generally to a clamping tool. More particularly, the present invention relates to a tire bead locking tool that assists in holding a tire in place while the tire is being mounted on a wheel rim.

BACKGROUND OF THE INVENTION

Special tools are often used in mounting tubeless tires onto metal rims. Tires can be difficult to mount on rims because usually the inner diameter of the tire is greater than the outer diameter of the rim. Therefore, the tire must be deformed or deflected in order to fit the tire over the rim.

New types of tires have been developed and deployed in recent years including low profile and the so-called "run flat" tires. These new types of tires are becoming more and more common. They often have extremely rigid and stiff side walls which may be difficult to install onto tire rim, using traditional tools and methods.

In the past, most tire rims were made of steel and were fairly resistant or forgiving to tool marks being made on the steel rim as a tool was used to place the tire on the rim. However, many modern wheels are made of aluminum or of steel with a chrome or other decorative coating. In any event, these more modern wheels are likely to appear scuffed, scratched or even be bent when placed in contact with typical steel tools.

Therefore, it is desirable to provide a tool that can be used in assisting placing a tire on a rim in view of the new modern, low profile, run flat tires which may have extremely stiff and rigid side walls. Further, it is desired to provide a tool that reduces the likelihood of damaging the chrome, aluminum finish or other decorative finish on modern wheels.

SUMMARY OF THE INVENTION

The foregoing needs are met, to a great extent, by the present invention, wherein in one aspect, an apparatus is provided that in some embodiments a tool is provided that assists in installing a tire on a wheel rim even when a tire is a low profile and/or a run flat tire, having extremely rigid and stiff side walls. Furthermore, in some embodiments of the invention a tool may be provided that reduces the likelihood of damage to a finish such as a chrome coating or aluminum finish while the tool engages the wheel for installing tire.

In accordance with one embodiment of the present invention, a tire bead locking tool is provided. The tool may include a body; a first jaw connected to the body; a second jaw pivotally connected to the body and located to oppose the first jaw; a locking mechanism configured to selectively lock the first and second jaws in a relative position with respect to each other; and a resilient member attached to one of the first and second jaws and located between the first and second jaws.

In accordance with another embodiment of the present invention, a method of manufacturing may also be provided. The method may include: forming a body; forming a pair of jaws on the body wherein at least one of the jaws pivots with respect to the body; attaching a resilient member to at least one of the jaws; and forming a locking mechanism that can selectively lock the jaws in a position; and extending a handle further from the jaws than the locking mechanism.

In accordance with yet another embodiment of the present invention, a tire bead locking tool is provided. The tool may include: a body; a first means for gripping connected to the body; a second means for gripping pivotally connected to the body and located to oppose the first means for gripping; a means for locking configured to selectively lock the first and second means for gripping in a relative position with respect to each other; and a resilient member attached to one of the first and second means for gripping and located between the first and second means for gripping.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
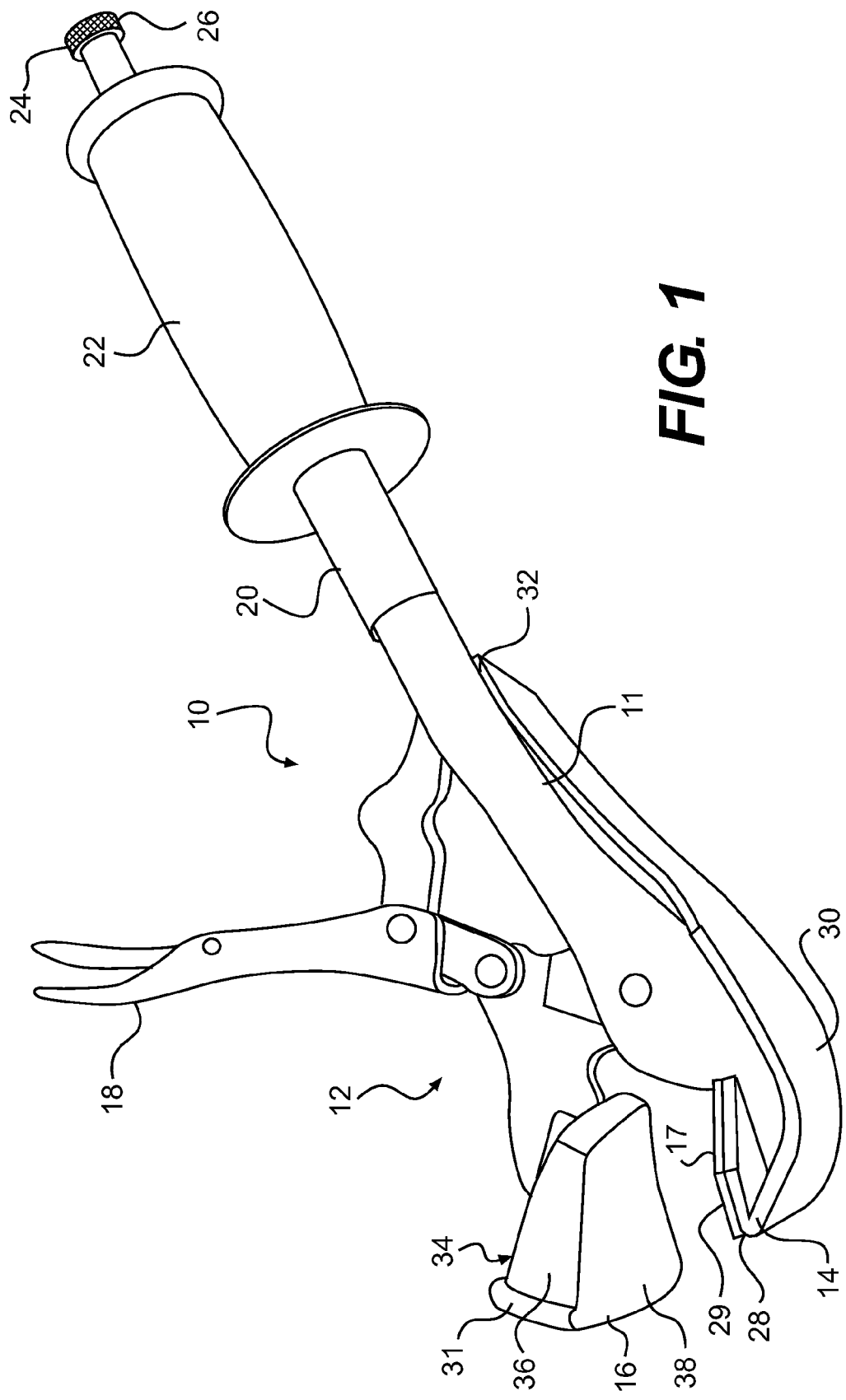
FIG. 1 is a perspective view illustrating a tire bead seating tool within accordance with one embodiment of the invention.

The invention will now be described with reference to the drawing figures, in which like reference numerals refer to like parts throughout. An embodiment in accordance with the present invention provides a tire bead seating tool 10.

Figure 2:
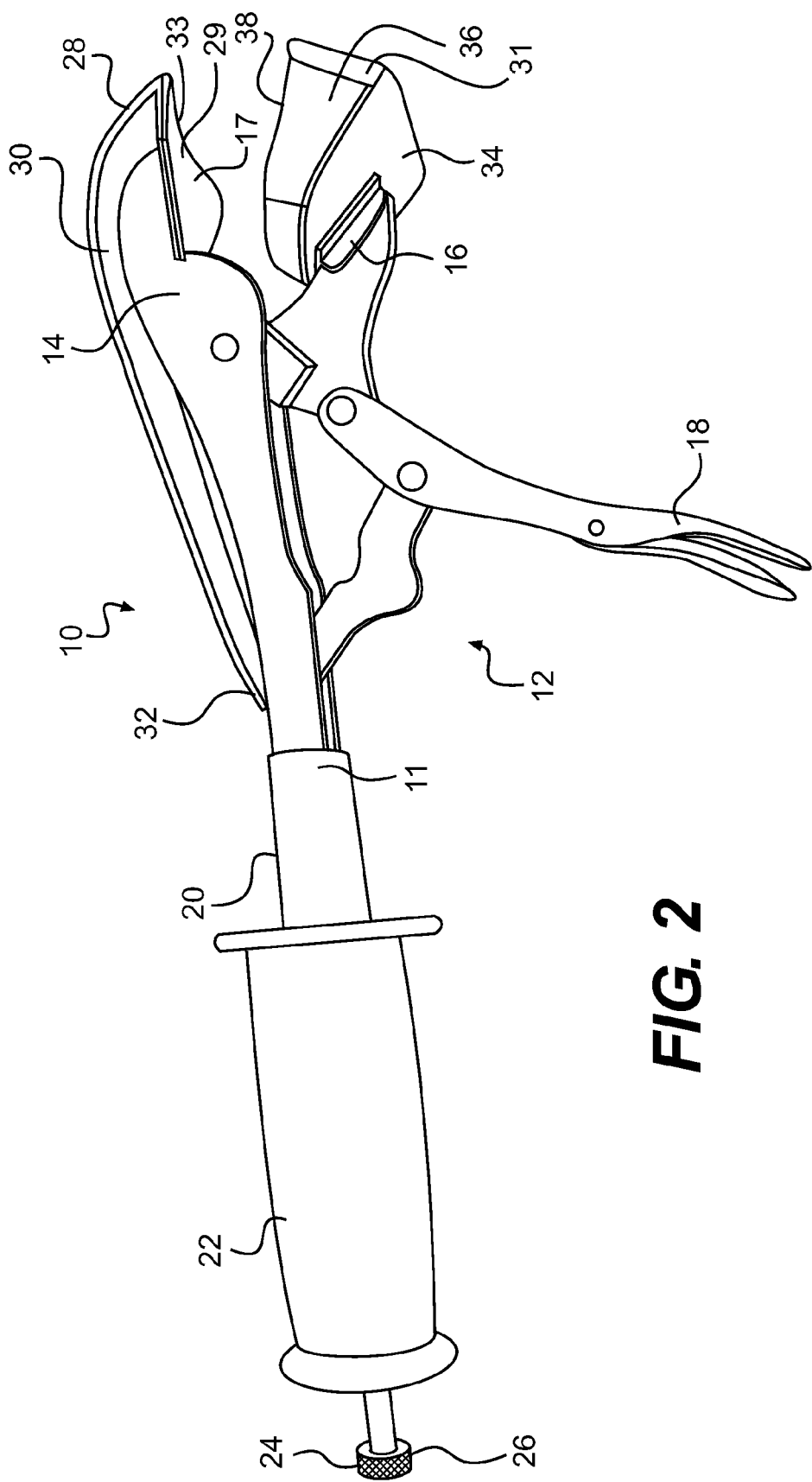
FIG. 2 is a perspective side view showing the opposite side of the tire bead seating tool shown in FIG. 1.

As shown in FIGS. 1 and 2, the tire bead seating tool 10 includes a body 11. The body 11 as attached to a locking mechanism 12. The body 11 also is attached to a top jaw 14 and a bottom jaw 16. One of ordinary skill in the art will appreciate after reviewing the disclosure herein and viewing the figures, that the body 11, a locking mechanism 12 and the top jaw 14 and lower jaw 16 are in some embodiments similar to a pair of locking pliers commonly known in the art. However, other aspects of the tool 10 are new and will be described in more detail later below.

The locking mechanism 12 as shown in FIGS. 1 and 2 is particularly similar to the locking mechanism found in common ordinary locking pliers and will not be described in detail. For example the springs, links, pivot points and other features of the locking mechanism 12 are well known and need not be explained in detail here.

While some embodiments use a locking mechanism 12 similar to those found in common locking pliers, other embodiments in accordance with the invention may use different locking mechanisms that may not necessarily be similar to common locking pliers. It also may be appreciated that the tool 10 in general may share some features similar to common ordinary locking pliers, the tool 10 also contains new and novel features that are in accordance with the invention.

Figure 3:
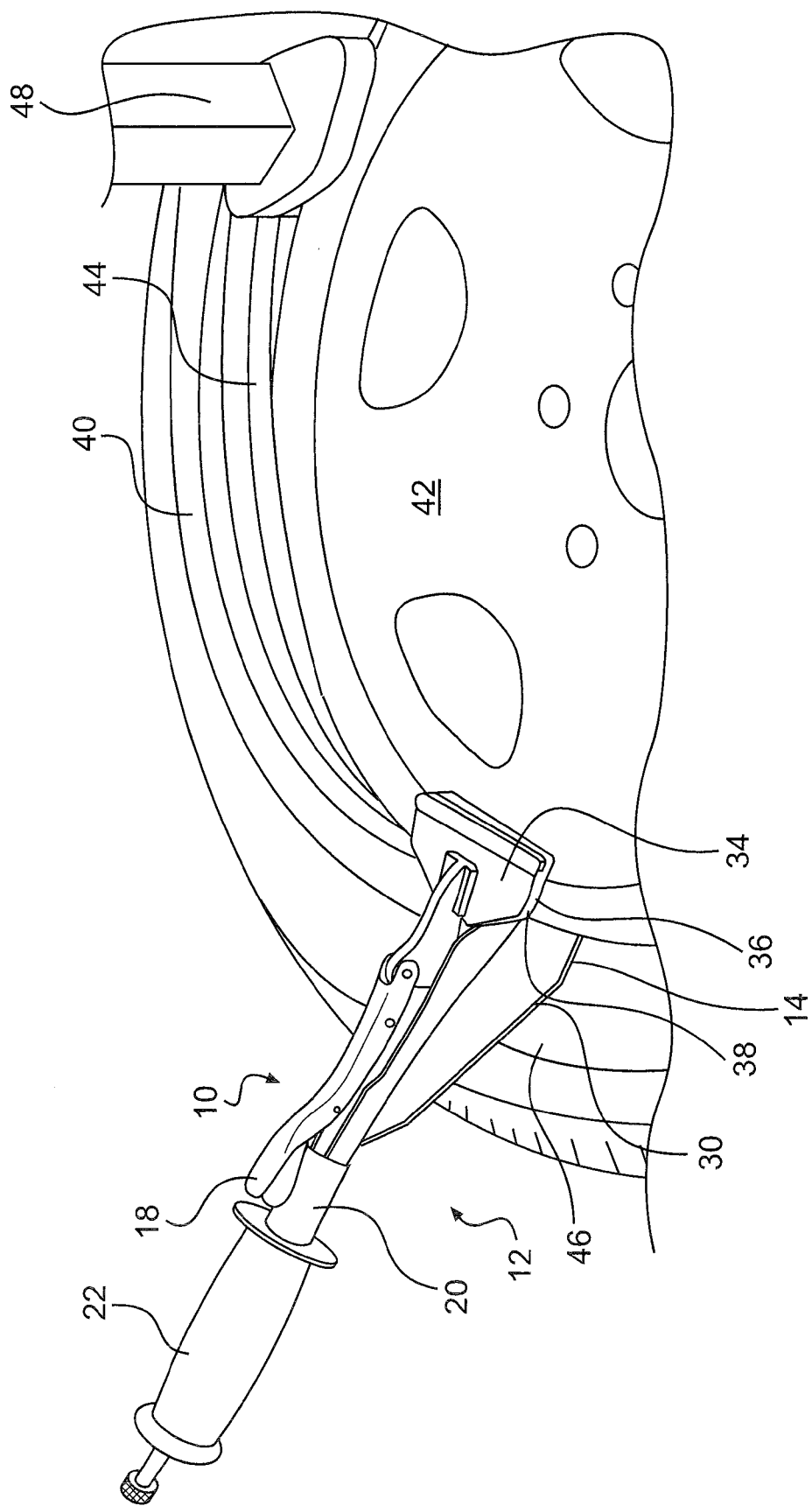
FIG. 3 is a perspective view of a tire bead seating tool attached to a wheel rim showing a tire partially installed on the wheel rim.

As shown in FIGS. 1 and 2, the tool 10 includes a moveable handle 18. The moveable handle 18 is pivotable and may be pivoted toward the body 11 to a position along the station arm, elongated handle 20, as shown in FIG. 3 for example. However, when the top jaw 14 and bottom 16 are spaced from each other, then the pivotal handle 18 is pivoted away from, and spaced from, the stationary elongated handle 20 as shown in FIGS. 1 and 2.

In some embodiments of the invention, when the moveable handle 18 is pivoted toward and parallel and/or approximate to the stationary elongated handle 20, the top jaw 14 and bottom jaw 16 are locked with respect to each other. Unlocking of the top jaw 14 and the bottom jaw 16 may be accomplished by moving the movable handle 18 away from the elongated stationary handle 20. In some embodiments of the invention the movable handle 18 must be unlocked before it can be moved as done with common locking pliers.

In some embodiments in accordance with the invention, a flexible or resilient grip 22 may be located on the stationary handle 20. The flexible or resilient grip 22 may provide a handling surface for a user to manipulate the tool 10 when the tool 10 is attached to a wheel as shown in FIG. 3. The flexible grip 22 may be similar to a bicycle grip 22. However, in other embodiments of the invention any suitable flexible or resilient material may be used to provide a grip for a users hand when gripping a tool 10.

Some embodiments and as shown in FIGS. 1 and 2 include an adjusting screw 24. An adjusting screw 24 may be manipulated to determine how close the top jaw 14 and the bottom jaw 16 may be to each other when the tool 10 is in a locking position with the multiple lever 18 pivoted toward the stationary handle 20.

In some embodiments in accordance with the invention, the adjusting mechanism 24 may include an adjusting screw 24 which is adjusted by turning the adjustment screw 24 either clockwise or counter clockwise. Some of the embodiments of the invention the adjustment screw 24 may have a knurled surface 26 to facilitate a user's ability to grip the adjusting screw 24 in order to adjust the locking mechanism 12. The adjusting screw 24 and locking mechanism 12 will not be discussed in additional detail as in some embodiments in accordance with the invention they work similar to those found in adjustable locking pliers. As shown in FIGS. 1 and 2, the adjusting screw 24 extends through the elongated stationary handle 20 and is much longer than those found in common locking pliers.

In accordance with the embodiment of the invention shown in FIGS. 1-3, a wide member 28 has been attached to the top jaw 14 to provide a gripping surface 29 much wider than would be typically found on ordinary locking pliers. The wide member 28, may be made up of a piece of sheet plate metal attached either by fastener, welding or any other suitable means to the top jaw 14. In other embodiments of the invention the wide member 28 may be integral with the top jaw 14. The gripping surface and wide member may have a curved edge 33 as shown in FIG. 2. The curved edge 33 may help in allowing the tool 10 grip a rim 42 as shown in FIG. 3.

The top jaw 14 also includes a rounded back plate 30. The rounded back plated 30 may be part of the wide number 28 as shown in FIGS. 1 and 2. In other embodiments of the invention, the rounded back plate 30 may be a separate piece from the wide number 28. The rounded back plate 30 may generally have a curved or rounded shape as shown in FIGS. 1-3. As shown in FIGS. 1 and 2 the curve is generally U-shaped where the U is wider than normal and one of the legs of the "U" may be longer than the other that is shown in FIGS. 1 and 2. The side edges of the rounded back plate 30 may be curved rather than flat.

The rounded back plate 30 may have an attachment point 32 where the rounded back plate 30 attaches to body 11 of the tool 10. In some embodiments of the invention, the rounded back plate 30 may be integral with the body 11 of the tool. In other embodiments the body 11, the elongated stationary handle 20 and the rounded back plate and/or the wide number 28 may be all a single piece. In other embodiments, these features may be separate or partially integrated.

The bottom jaw 16 may also have a lower jaw plate 34 that may widen the gripping ability of the lower jaw 16. In some embodiments of the invention the lower jaw plate 34 maybe about the same width as the wide member 28 attached to the top jaw 14. In some embodiments, both the wide member 28 and the lower jaw plate 34 are wider than the body 11.

The bottom jaw 16 may also be equipped with a front plate 31 attached to the lower jaw plate 34 at the front of the tool 10. The front plate 31 may be connected to the lower jaw plate 34 by wielding, fasters, or any other suitable method. In some embodiments, the lower jaw plate 34 and the front plate 31 may be a single part. Together the lower jaw plate 34 and the front plate 31 may form an angled or hook-shaped lower jaw 16.

The lower jaw plate 34 and or the front plate 31 may also support and be attached to a resilient insert 36. The resilient insert 36 is located on the lower jaw plate 34, behind the front plate 31 and located between the top jaw 14 and the bottom jaw 16. The angle or hook shape formed by the intersection of the lower jaw plate 34 and the front plate 31 creates a space for the resilient insert 36.

In some embodiments of the invention the resilient insert 36 may be located on the wide number 28. In other embodiments of the invention resilient members 17 and 36 may be located on both the wide number 28 and the lower jaw plate 34 as shown in FIG. 2. Resilient insert 36 may be made of rubber or any other suitable resilient material. The resilient insert 36 provides a resilient gripping surface 38.

As shown in FIG. 3, a resilient gripping surface 38 may be attached to a rim 42 upon which a tire 40 is being installed. As shown in FIG. 3, the lower jaw plate 34 is pressing on the resilient insert 36 which is in turn providing a resilient gripping surface 38 to grip the rim 42. The top jaw 14 is also grabbing an underside portion of the rim 42 and the rounded back plate 30 is pressed against a side wall 46 of the tire 40. The tire bead 44 is shown in FIG. 3 to be partially installed against the bottom side of the rim 42 near the tool 10 and not installed but rather located outside of the rim 42 above the tool 10.

As oriented in FIG. 3, the tool 10 may be grabbed by a user at the flexible grip 22 and moved in a downward position causing the rounded back plate 30 to press in and deflect the side wall 46 of the tire 40. As shown in FIG. 3, the resilient insert 36 is the only part of the tool 10 contacting a part of the rim 42 that is facing outward, thus if the rim 42 had an aluminum finish, a chrome finish, a decorative finish, a corrosion resistant finish or other finish these would not be damaged by metal parts of the tool 10 as they are when contacted by resilient insert 36.

In some embodiments, the tool 10 (and as shown in FIG. 3) may be used in conjunction with the tire installing and removing machine 48. The tire installing and removing machine 48 may be any tire installing and removing machine that may be commonly used in the art.

In some embodiments of the invention tool 10 may be made of metal such as steel, aluminum, or other suitable material and may be coated with a corrosion resisting coating such as chromium, zinc or any other corrosion resisting coating.

Figure 4:
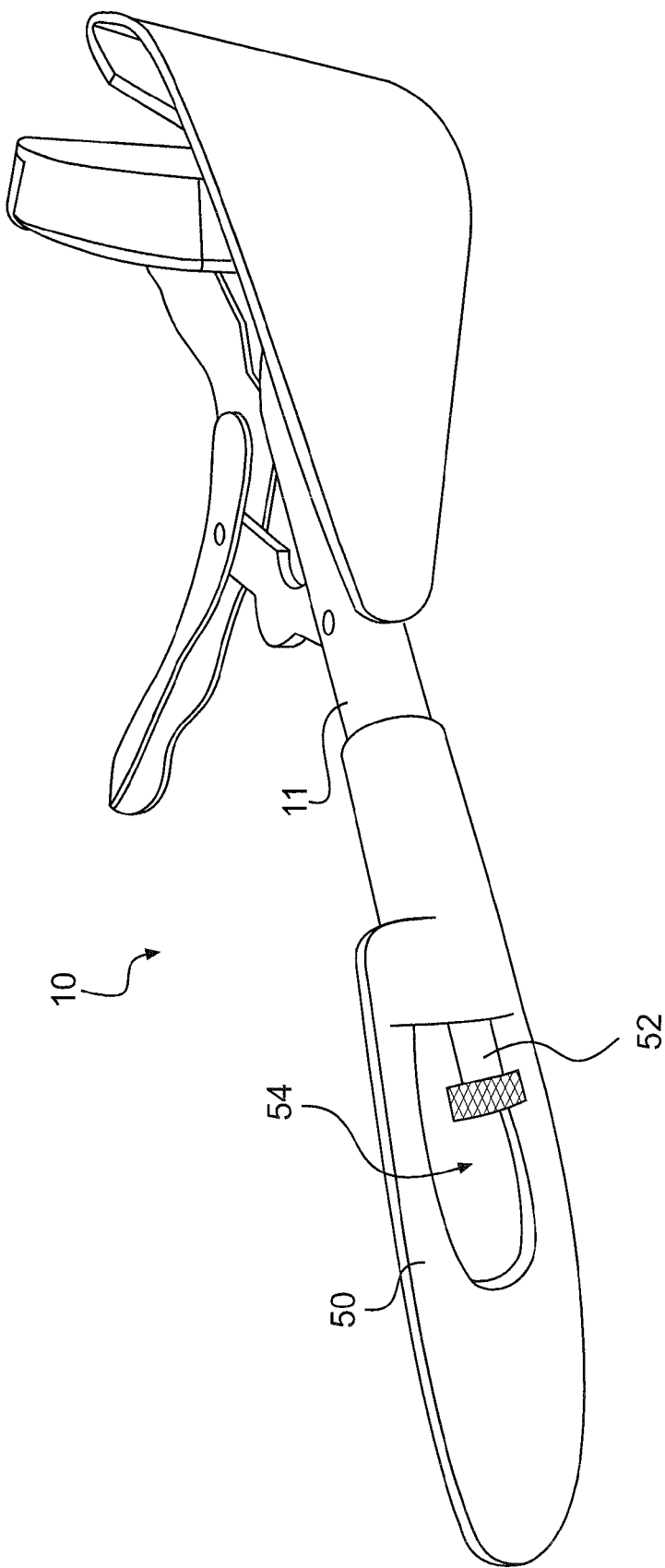
FIG. 4 is a perspective view of a tire bead seating tool in accordance with another embodiment of the invention.

FIG. 4 shows a rear view of another embodiment of the invention. The embodiment shown in FIG. 4 has a "spoon shaped" handle 50. A shorter adjusting screw 52 is used. A hole 54 in the handle 50 allows a user to more easily access and actuate the shorter adjusting screw 52. when the "spoon shaped" handle 50 is used. The "spoon shaped" handle 50 may be wider than the body 11. This type of handle 50 may provide a flat surface for a user's hand to push against when using the tool 10. Some users may find the "spoon shaped" handle 50 a more comfortable handle 50 then the handle 20 shown in the embodiments shown in FIGS. 1-3. Other users may prefer the handle 20 of the embodiment shown in FIGS. 1-3.

The "spoon shaped" handle 50 may be attached to the body 11 by wielding, fasteners, or any other suitable method. In some embodiments, the body 11 and the handle 50 may be a single part.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tire bead locking tool comprising:
a body having a spoon-shaped handle at a first end;
a first jaw connected to the body at a second end, the first jaw having a front plate at a first end of the first jaw, the front plate is angled so that the front plate and the first jaw together form a space;
a second jaw pivotally connected to the body and located to oppose and pivot independently of the first jaw;
a back plate having a first end with a first width that is wider than the body and a second end with a tapered second width with respect to the first width, wherein the back plate is configured to engage a sidewall of a tire on a first side and has a curved gripping surface on a second side to grip a first side of a tire rim, and wherein the back plate forms the first jaw;
a wide member having the curved gripping surface and integrally attached to the back plate at the first end, wherein the wide member is parallel to a longer axis of the body and is wider than the body;
a locking mechanism pivotally coupled to the body and configured to selectively lock the first and the second jaws in a relative position with respect to each other; and
a resilient member positioned in the space formed between the front plate and the first jaw and located between the first and second jaws, the resilient member configured to engage a second side of the tire rim, wherein the spoon-shaped handle has a surface defining a hole that receives an adjusting screw that adjusts to position of the first and second jaws.

2. The tool of claim 1, wherein the back plate and the wide member form a U shape.

3. The tool of claim 1, wherein the resilient member is comprised of rubber.

4. The tool of claim 1, wherein the body defines a handle and the locking mechanism defines a lever wherein the handle is located further away from the jaws than the lever when the lever is in a position adjacent to the body.

5. The tool of claim 4, further comprising a resilient hand grip on the handle.

6. The tool of claim 1, further comprising knurling on the adjusting screw.

7. The tool of claim 1, wherein the tool is coated with a corrosion resistant material.

8. A tire bead locking tool comprising:
a body having a handle at a first end;
first means for gripping connected to the body at a second end, the first means for gripping having a front plate at a first end of the first means for gripping, the front plate is angled so that the front plate and the first means for gripping together form a space;
second means for gripping pivotally connected to the body and located to oppose and to pivot independently of the first means for gripping;
a back plate having a first end with a first width that is wider than the body and a second end with a tapered second width with respect to the first width, wherein the back plate is configured to engage a sidewall of a tire on a first side and has a curved gripping surface on a second side to grip a first side of a tire rim, and wherein the back plate forms the first means for gripping;
a wide member having the curved gripping surface and integrally attached to the back plate at the first end, wherein the wide member is parallel to a longer axis of the body and is wider than the body;
means for locking pivotally connected to the body and configured to selectively lock the first and second means for gripping in a relative position with respect to each other; and
a resilient member positioned in the space formed between the front plate and the first means for gripping and located between the first and second means for gripping, wherein the spoon-shaped handle has a surface defining a hole that receives an adjusting screw that adjusts to position of the first and second means for gripping.

9. The tool of claim 8, wherein the handle is a spoon-shaped handle further comprises a hole with an adjusting screw located therein.

10. The tool of claim 8, wherein the back plate and the wide member from a U shape.

11. The tool of claim 8, wherein the body defines a handle and the locking mechanism defines a lever wherein the handle is located further away from the first and second means for gripping than the lever when the lever is in a position adjacent to the body.

12. The tool of claim 9, further comprising knurling on the adjusting screw.

13. The tool of claim 8, wherein the tool is coated with a corrosion resistant material.

14. The tool of claim 1, wherein a second resilient member is positioned on the wide member.

15. The tool of claim 8, wherein a second resilient member is positioned on the wide member.

16. The tool of claim 1, wherein the first jaw and the wide member are the same width.

17. The tool of claim 8, wherein the first means for gripping and the wide member are the same width.

* * * * *